United States Patent [19]
Ray et al.

[11] Patent Number: 5,974,483
[45] Date of Patent: Oct. 26, 1999

[54] MULTIPLE TRANSPARENT ACCESS TO IN PUT PERIPHERALS

[75] Inventors: Kenneth D. Ray, Bellevue; Forrest C. Foltz, Woodinville, both of Wash.

[73] Assignee: Microsoft Corporation, Redmond, Wash.

[21] Appl. No.: 08/861,327

[22] Filed: May 21, 1997

[51] Int. Cl.⁶ ..................................................... G06F 13/14
[52] U.S. Cl. .......................... 710/52; 326/56; 365/189.05; 365/230.08; 711/118
[58] Field of Search .............................. 395/872, 200.611; 326/56; 365/189.05, 230.08; 711/118; 710/52

[56] References Cited

U.S. PATENT DOCUMENTS 5,414,455 5/1995 Hooper et al. ............................. 348/7
5,506,809 4/1996 Csoppenszky et al. ................. 365/221

*Primary Examiner*—Thomas C. Lee
*Assistant Examiner*—Abdelmoniem I. Elamin
*Attorney, Agent, or Firm*—Lee & Hayes, PLLC

[57] ABSTRACT

A ring buffer in accordance with the invention includes a plurality of registers that form a circular sequence of registers. A write pointer references one of the registers. A plurality of read pointers correspond respectively to a plurality of data consumers. Each read pointer references one of the registers. Upon receiving a new data element, the data element is written to the register that is referenced by the write pointer, and the write pointer is advanced. Upon receiving a request from a data consumer, a data element is read from the register referenced by the read pointer corresponding to the data consumer, and the read pointer is advanced.

22 Claims, 6 Drawing Sheets

MULTIPLE TRANSPARENT ACCESS TO INPUT PERIPHERALS

TECHNICAL FIELD

This invention relates to ring buffers and to methods of buffering data for a plurality of consuming clients.

BACKGROUND OF THE INVENTION

A buffer is an area of storage that temporarily holds data between the time it is generated by an input device and the time that it is actually used by some other component such as a computer or a computer process. One purpose of a buffer is to accommodate the different rates at which data is produced and consumed.

Printing from a computer-based word processing application illustrates the need for buffering. Typically, the word processing application is capable of producing print data several orders of magnitude faster than a printer can accept it. Rather than making the word processor wait for the printer, a computer operating system accepts the data from the word processor and stores it in a buffer. The operating system then feeds the data to the printer from the buffer at an appropriate rate, while the word processor continues with other work.

Keyboard input is another common task for which buffering is used. At any particular moment, an application program or other client for which a keystroke is destined may or may not be ready to receive keystroke data. Accordingly, an operating system stores keystroke data in a buffer, and then provides it to application programs when they specifically request it.

FIG. 1 illustrates a ring buffer 8 such as commonly used to buffer input data from computer input peripherals such as keyboards. A ring buffer, also referred to as a circular buffer, has a plurality of storage registers 9 that are typically located in a contiguous portion of addressable computer memory, extending from a start register having a start address to an end register having an end address. The registers are maintained so that they appear to "wrap around" in a circle, so that the last register is adjacent the first.

The appearance of circular organization is accomplished by using two pointers: a write pointer and a read pointer. Each pointer references a particular location or register in the buffer. The write buffer indicates the next register to which input data should be written. The read buffer indicates the next location for reading from the buffer.

Initially, when the buffer is empty, both the write pointer and the read pointer reference the same register. When a data element is received from a producer such as a keyboard, the data is written to the location referenced by the write pointer, and the write pointer is advanced so that it references the next register in the buffer. Data received from the producer thus begins to fill the buffer, starting from the start register. To consume data, an element is taken from the register referenced by the read pointer. The read pointer advances after each read, so that it always references the next location from which data should be read. After either pointer reaches the point where it references the end register, the next advance moves or changes the pointer so that it references the address of the start register rather than the next numerical address.

If the data consumer is slow, it is possible for the buffer to fill completely. The buffer is full when the write pointer references the register that immediately precedes the register referenced by the read pointer. As a result of this convention, the capacity of a ring buffer is actually one less than the number of registers that form the ring buffer. The unoccupied register referenced by the write pointer is referred to as a "sentinel" register.

If additional data is received when the buffer is full, there are two possible responses. One response is to simply discard any new input data, without writing it to the buffer. Another response is write the new data after arbitrarily advancing the read pointer. This latter option has the effect of discarding the oldest data, while preserving the most recently entered data.

As more and more input peripheral devices are created for use with home computers, there is an increasing need for concurrent transparent access to such devices from multiple application programs. A VCR-type remote control device is an example of an input device whose input might be needed by multiple application programs or processes within a computer. Certain buttons, such as media transport controls, might produce data that is needed by one application program, while other buttons, such as menu control buttons, might produce data needed by another application program.

In the popular Windows® operating system, an application program receives buffered data input from peripherals by "opening" the peripherals using system API (application programming interface) calls. It would be desirable for different application programs to be able to open the same input device, and to read data from the device without affecting the sequence of data elements provided to other devices from the input device. It would be desirable to accomplish this without requiring the operating system to use multiple ring buffers.

SUMMARY OF THE INVENTION

The invention allows multiple consumers have access to a single producer of data, in a manner semantically equivalent to each consumer having its own separate ring buffer into which the system copies data from the producer. However, no such separate ring buffers are actually implemented. Rather, the system implements only a single ring buffer and a single write pointer into that ring buffer. In addition, the system maintains multiple read pointers, corresponding respectively to each consumer. The read pointers are handled independently of each other—when data is read for a particular consumer, only that consumer's read pointer is advanced.

DETAILED DESCRIPTION

Figure 2:
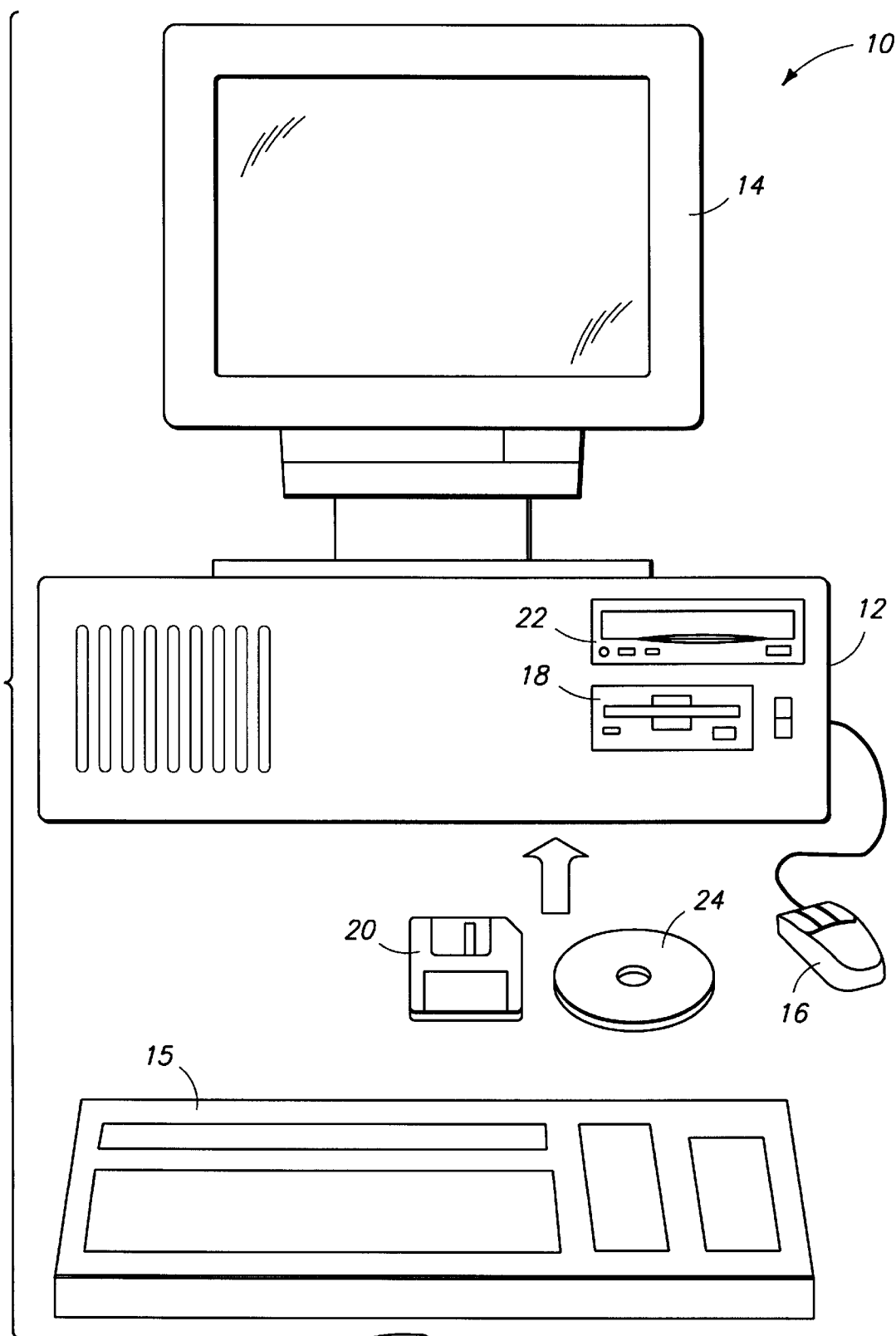
FIG. 2 shows a computer system such as might be used in conjunction with the invention.

FIG. 2 illustrates a computer system in which the invention might be utilized, generally designated by reference numeral 10. Computer system 10 in the illustrated embodiment is a conventional desktop IBM-compatible computer. System 10 has a central processing unit (CPU) 12, a display monitor 14, a keyboard 15, and a mouse 16. The computer 10 also utilizes a computer-readable storage medium such as a floppy memory diskette 20 in conjunction with a floppy disk drive 18. Computer system 10 utilizes a further computer-readable storage medium in the form of an optical storage medium 24, such as a CD-ROM or DVD. System 10 might also include another input device in addition to, or in lieu of, the keyboard 15 and mouse 16 including such devices as a track ball, stylus, or the like.

Figure 3:
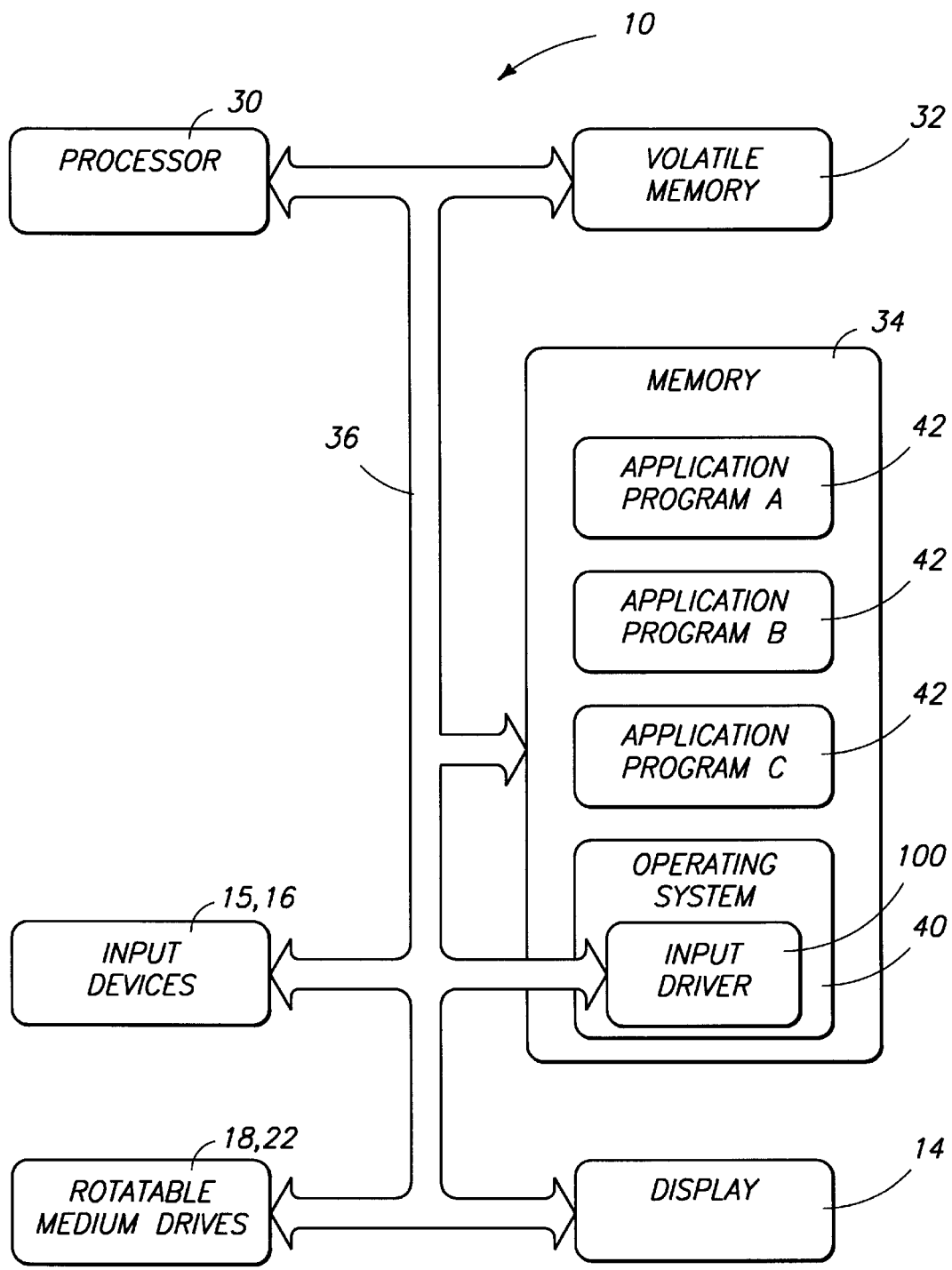
FIG. 3 is a block diagram of the computer of FIG. 2.

FIG. 3 shows a functional block diagram of computer system 10. System 10 has a processor 30 and one or more additional forms of computer-readable storage media. Specifically, system 10 includes a volatile memory 32 (e.g., RAM), and a non-volatile memory 34 interconnected by an internal bus 36. The non-volatile memory 34 can be implemented as integrated circuit chips (e.g., ROM, EEPROM), disk drive(s) (e.g., floppy, optical, hard), or a combination of both.

The display 14 is connected to the bus 36 through appropriate hardware interface drivers (not shown). Additionally, the input devices 15, 16 are connected to supply data to the bus 36 via appropriate I/O ports. Floppy drive 18 and access device 22 are also connected through bus 36.

The computer 10 runs an operating system 40 that is stored on the non-volatile memory 34 and executes on the processor 30. One preferred operating system is a Windows® brand operating system sold by Microsoft Corporation, such as Windows® 95 or Windows NT™ or other derivative versions of Windows®. However, other operating systems may be employed, such as the Macintosh OS from Apple Corporation, the OS/2 Presentation Manager from IBM, and the Solaris OS from Sun Microsystems. The operating system implements the ring buffer scheme described below in the described embodiment of the invention.

A plurality of computer applications 42 are stored in the non-volatile memory 34. An application 42 can be loaded into the memory 34 or 32 from the floppy diskette 20 or CD-ROM 24, or alternatively, downloaded from a network via a network port (not shown). Each application 42 is a potential client or consumer of data from input devices such as keyboard 15 and mouse 16. The applications interact with the operating system to consume data elements generated by the input devices. Specifically, an application makes specific calls to the operating system to open input devices, while also requesting input buffers of specific sizes. When the application is ready to consume a data element, it makes another call to the operating system. The operating system responds by reading a data element from a data buffer and by returning the data element to the application.

Although the invention is described within the illustrated context of a familiar desktop computer, aspects of the invention might also be employed in other forms of computing devices, such as laptop computers, hand-held computers, set-top boxes, game devices, and other types of computing and entertainment devices. The invention can be implemented on many different types of devices, whether or not they include complex operating systems such as the ones mentioned above. In most cases, the invention will be embodied in a computer program that has instructions designed to implement the steps described herein.

The invention will be described in the context of an input driver 100 for keyboard 15, implemented by operating system 34. The keyboard generates data elements or structures that describe certain events (key down, key up, etc). It is the responsibility of the input driver to buffer these data elements in a first-in, first-out manner until such time as a client or data consumer is able to retrieve them. In this case, the input driver implements a ring buffer for buffering sequential data elements from an input stream for consumption by a plurality of data consumers.

In accordance with the invention, there are a plurality of possible consumers for the data originating from a single device, and input driver 100 is responsible for providing data elements to each of these consumers. The consumers do not interfere with each other when they read data from input driver 100. Specifically, the same data, in the same order, is provided to each consumer (unless there is an overflow). In the embodiment described herein, the data consumers are applications 42.

Rather than creating a ring buffer for each consumer, the input driver creates and maintains only a single ring buffer. The ring buffer has a plurality of registers arranged like a conventional ring buffer. In addition, a write pointer is used like the write pointer in a conventional ring buffer. The write pointer cycles through a circular sequence of the registers to indicate where sequential data elements from an input stream should be written. The term "cycle" is used to indicate that the pointer advances to the end of the sequence of registers and then begins over again at the start register.

An input driver in accordance with the invention uses a plurality of read pointers, corresponding respectively to individual data consumers. Any particular read pointer cycles independently through the circular sequence of registers to indicate where data elements should be consumed by respective data consumers.

Figure 1:
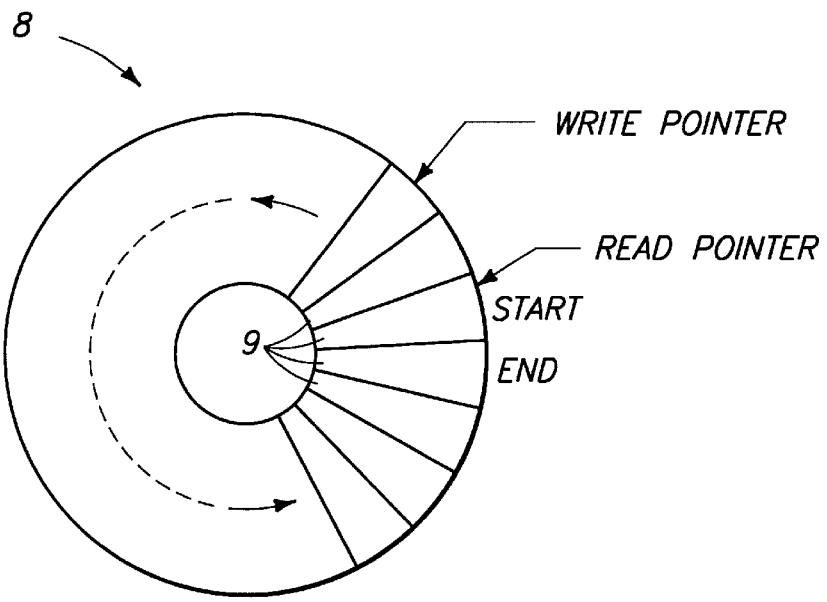
FIG. 1 shows a ring buffer in accordance with the prior art.
Figure 4:
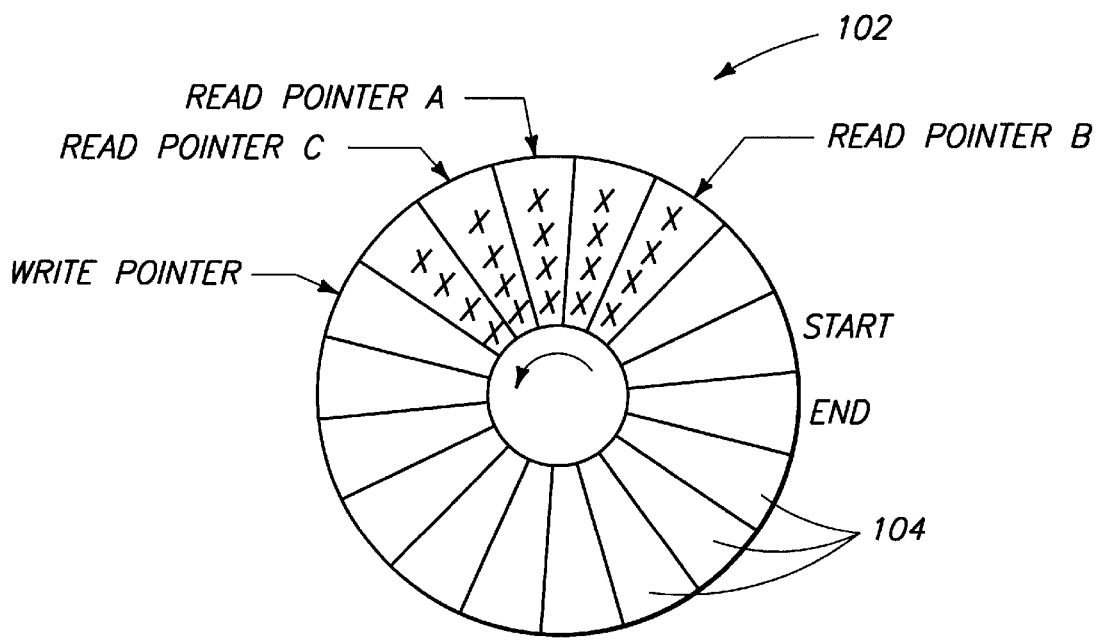
FIGS. 4–9 show a ring buffer in accordance with the invention.

FIG. 4 illustrates this concept in more detail. FIG. 4 shows a ring buffer 102 formed by a plurality of registers 104. The registers are in a contiguous region of addressable memory of computer 10, extending from a start address to an end address. FIG. 4 shows a circular arrangement or sequence of the registers, in which the end register wraps around to meet the start register. This circular depiction of the ring buffer registers will be used in the following discussion.

As shown in FIG. 4, the invention includes a single write pointer that references a single one of the registers 104. In the described embodiment of the invention, the write pointer is a memory register that either contains the address of the referenced register or contains an index from which the address can be obtained. In either case, the write pointer indicates where the next block of data should be placed in the ring buffer.

The invention also includes a plurality of read pointers that reference respective registers 104. The read pointers correspond respectively to a plurality of data consumers. Like the write pointer, each read pointer, is itself a memory or processor register that references the next block of data that should be provided to the corresponding consumer from the ring buffer. FIG. 4 shows three read pointers: A, B, and C. They correspond respectively to data consumers A, B, and C. Registers with the designation "xxxx" contain data elements for consumption by the data consumers.

In response to receiving a data element from the keyboard input stream, input driver 100 performs the following steps, in the order listed: (a) writing the data element to the register that is referenced by the write pointer and (b) advancing the write pointer to reference a subsequent register in the circular sequence of registers. These steps are performed atomically or in an interlocked manner to avoid problems that might result from concurrent access to the ring buffer by multiple consumers.

Figure 5:
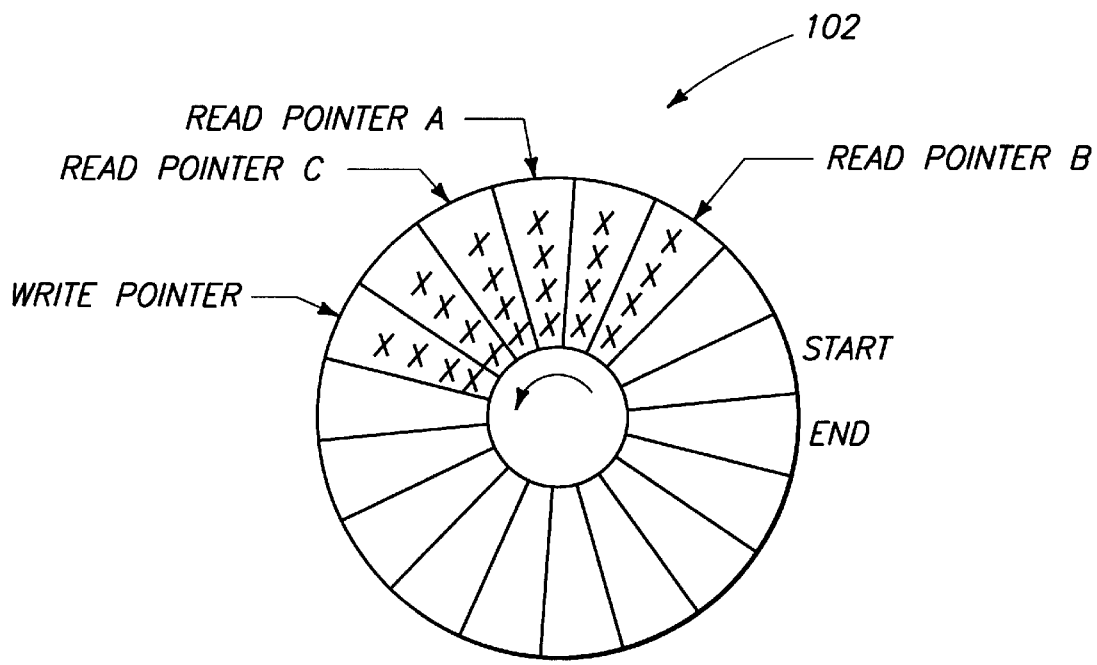
Figure 6:
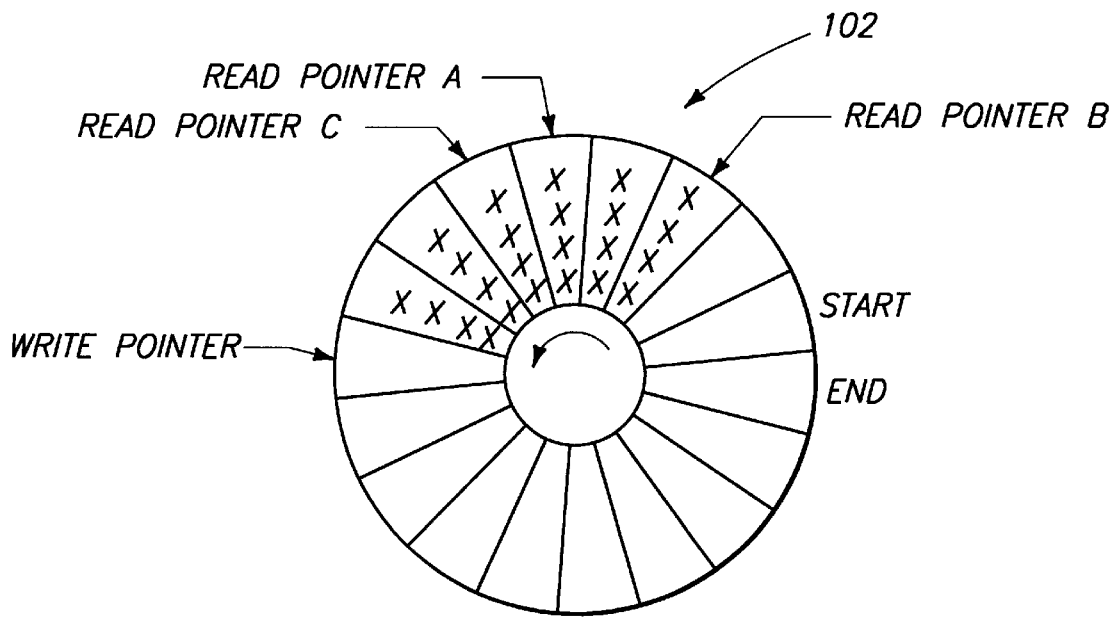

FIGS. 5 and 6 show the effect of receiving and writing a single data element. First, the data element is written to the register referenced by the write pointer (FIG. 5). Then, the write pointer is adjusted so that it points or refers to the next register in the circular sequence (FIG. 6).

In response to a request from a particular data consumer, input driver 100 performs the following steps, in the order listed: (a) reading a data element from the register referenced by the read pointer corresponding to the particular data consumer and (b) advancing the read pointer to reference a subsequent register in the circular sequence of registers. Again, these steps are performed atomically or in an interlocked manner to avoid problems that might result from concurrent access to the ring buffer by multiple consumers.

Figure 7:
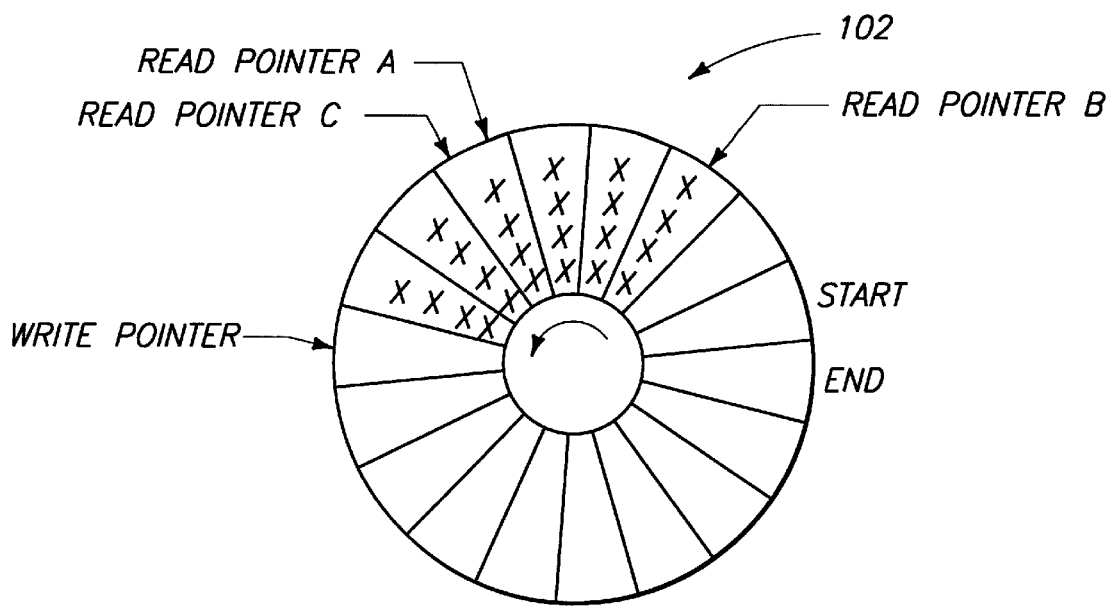

FIG. 7 shows the effect of a data request from data consumer A. First, a data element is read from the register referenced by read pointer A. This data element is provided to data consumer A. Next, read pointer A is adjusted so that it points or refers to the next register in the circular sequence. The other read pointers are not affected.

It is typical for individual application programs to request specific buffer sizes when opening an input device. In accordance with the invention, ring buffer 102 includes enough registers to satisfy the largest buffer size request. Thus, input driver 100 performs a step of allocating a number of storage registers that is equal to or greater than the largest data buffer size requested by any individual data consumer. Specifically, input driver allocates a ring buffer having a number of storage registers that is one element greater than the largest data buffer size requested by any data consumer, thus allowing for an unoccupied sentinel register as described above in the "Background" section of the specification.

Because of this characteristic, the ring buffer might include more that the number of registers specified by a particular application program. In practice, the ring buffer may need to be resized when a new application program requests a buffer that is larger than the currently allocated buffer. This may involve creating an entirely new buffer, and copying the contents of the old buffer to the new buffer.

When the ring buffer is larger than a particular application program has specified, input driver 100 manipulates the ring buffer so that it appears to the application program that the ring buffer is only large enough to hold the specified number of elements. Specifically, input driver 100 arbitrarily advances the read pointer corresponding to an individual data consumer when the relationship between the read pointer and the write pointer indicates that more than n data elements are buffered for said individual data consumer, where n is the size of the ring buffer specified by the data consumer. Specifically, the input driver advances the read pointer whenever the write pointer advances ahead of the read pointer by more than n.

Figure 8:
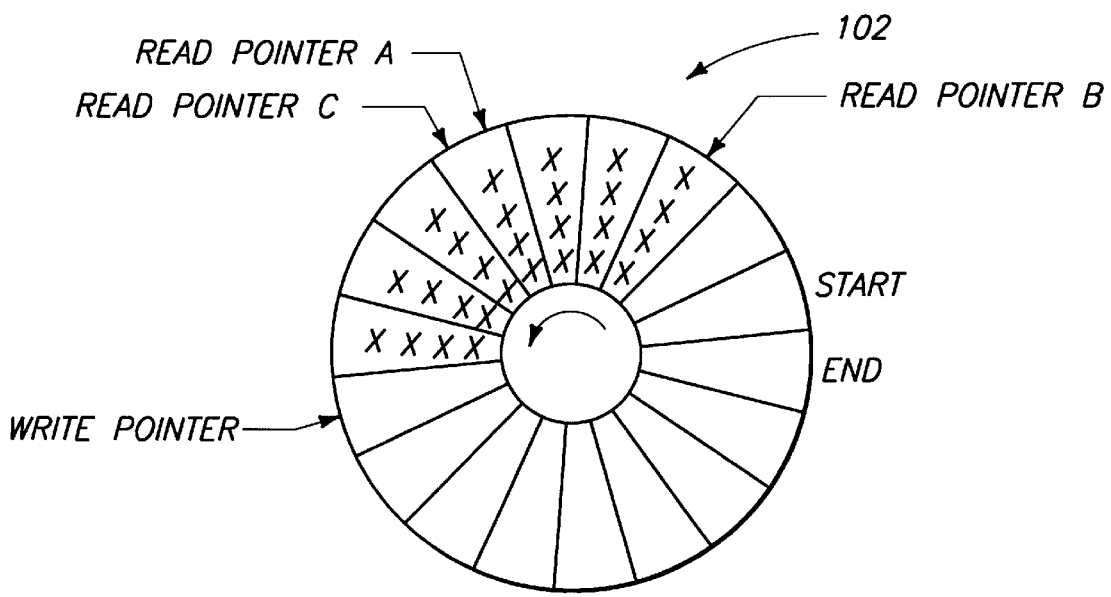

This is illustrated in FIG. 8, where it is assumed that application program A has specified a buffer size of only four elements. In FIG. 8, the write pointer is four registers ahead of read pointer A, indicating that there are four unread data elements for application program A. When the next data element arrives, read pointer A is advanced before writing the new element and advancing the write pointer. From the perspective of application program A, this has the effect of discarding a data element.

From time to time, an application program might make a request to flush or empty the ring buffer associated with an input device. This is accomplished in the invention by setting the read pointer corresponding to the application program to indicate that no more data elements are available from the ring buffer. Specifically, the read pointer is set so that it equals the write pointer.

Figure 9:
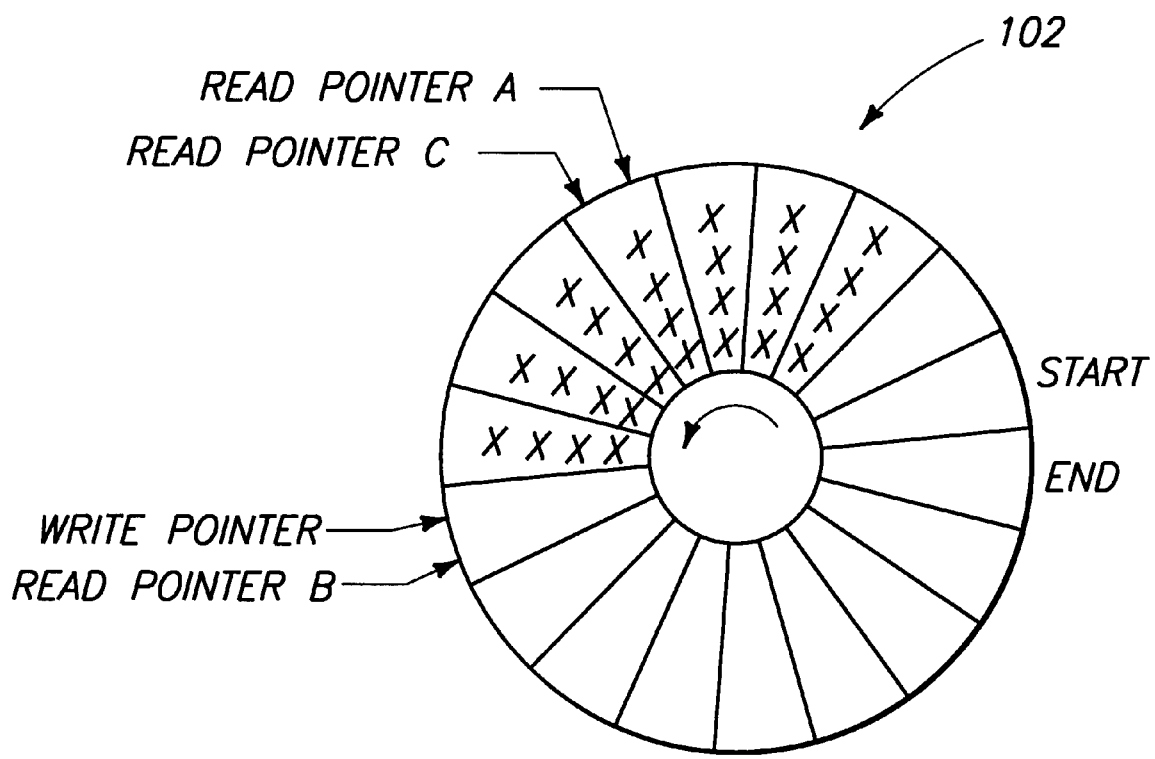

The result of this is shown in FIG. 9, after program B has requested a flush of its ring buffer. Read pointer B is set so that it references the same register as the write pointer. This indicates that the buffer is empty, with respect to further requests from program B. Nevertheless, a subsequent request from program A will retrieve a data element from the location referenced by read pointer A.

The invention allows multiple clients to consume data from a single input stream, with each client being transparent to all other clients. When the invention is implemented by a server such as a computer operating system, the server buffers the input stream using a single ring buffer, regardless of the number of consuming clients. Each client can specify a buffer size, and data is provided to the client as if that is the actual buffer size used by the server. Even though it appears that each client has its own buffer, the server uses only a single ring buffer. In many situations, this results in significant memory savings, as well execution savings since the system does not need to copy the data from the producer to each individual ring buffer.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A ring buffer for buffering sequential data elements from an input stream for consumption by a plurality of data consumers, wherein different data consumers request buffers having different numbers of registers, comprising:

a plurality of registers that form a circular sequence of registers;

a write pointer that references one of the registers;

a plurality of read pointers corresponding respectively to the plurality of data consumers, wherein each read pointer references one of the registers;

a data processor programmed to perform the following steps:

in response to receiving a data element from the input stream, (a) writing the data element to the register that is referenced by the write pointer and (b) advancing the write pointer to reference a subsequent register in the circular sequence of registers;

in response to a request from a particular data consumer, (a) reading a data element from the register referenced by the read pointer corresponding to the particular data consumer and (b) advancing the read pointer to reference a subsequent register in the circular sequence of registers;

advancing the read pointer corresponding to an individual data consumer when the relationship between said read pointer and the write pointer indicates that more than n data elements are buffered for said individual data consumer, where n is the number of data registers requested by said individual data consumer.

2. A ring buffer as recited in claim 1, wherein the steps of reading a data element and advancing the read pointer are performed atomically.

3. A ring buffer as recited in claim 1, wherein the step of writing the data element and advancing the write pointer are performed atomically.

4. A ring buffer as recited in claim 1, wherein the plurality of registers includes enough registers to satisfy the largest buffer size request.

5. A ring buffer as recited in claim 1, wherein the plurality of registers includes more than the specified number of registers, the data processor being further programmed to perform additional steps comprising:

advancing the read pointer corresponding to said individual data consumer when the write pointer advances ahead of said read pointer by more than n, where n is the specified number of registers.

6. A ring buffer as recited in claim 1, the data processor being further programmed to perform an additional step comprising:

in response to a flush request by an individual data consumer, setting the read pointer corresponding to said individual data consumer so that it equals the write pointer.

7. A ring buffer as recited in claim 1, the data processor being further programmed to perform an additional step comprising:

in response to a flush request by an individual data consumer, setting the read pointer corresponding to said individual data consumer to indicate that no more data elements are available from the plurality of registers.

8. A method of buffering sequential data elements from an input stream for consumption by a plurality of data consumers, comprising the following steps:

receiving requests from the plurality of data consumers for buffers of different sizes;

allocating enough registers in a circular sequence of registers to satisfy the largest buffer size request;

cycling a write pointer through the circular sequence of registers to indicate where sequential data elements from the input stream should be written;

cycling a plurality of read pointers independently through the circular sequence of registers to indicate where data should be consumed by respectively corresponding data consumers;

advancing the read pointer corresponding to a particular data consumer when the relationship between said read pointer and the write pointer indicates that more than n data elements are buffered for said particular data consumer, where n is the size of the buffer requested by said particular data consumer.

9. A method as recited in claim 8, wherein the advancing step comprises:

advancing the read pointer corresponding to said particular data consumer when the write pointer advances ahead of said read pointer by more than n.

10. A method as recited in claim 8, further comprising the following additional step:

in response to a flush request by an individual data consumer, setting the read pointer corresponding to said individual data consumer so that it equals the write pointer.

11. A method as recited in claim 8, further comprising the following additional step:

in response to a flush request by an individual data consumer, setting the read pointer corresponding to said individual data consumer to indicate that no more data elements are available from the plurality of registers.

12. A method of buffering sequential data elements from an input stream for consumption by a plurality of data consumers, comprising the following steps:

receiving requests from the plurality of data consumers for buffers of different sizes;

allocating enough registers in a circular sequence of registers to satisfy the largest buffer size request;

providing a write pointer that references one of the registers;

providing a plurality of read pointers corresponding respectively to the plurality of data consumers, wherein each read pointer references one of the registers;

in response to receiving a data element from the input stream, (a) writing the data element to the register that is referenced by the write pointer and (b) advancing the write pointer to reference a subsequent register in the circular sequence of registers;

in response to a request from a particular data consumer, (a) reading a data element from the register referenced by the read pointer corresponding to the particular data consumer and (b) advancing the read pointer to reference a subsequent register in the circular sequence of registers;

advancing the read pointer corresponding to a particular data consumer when the relationship between said read pointer and the write pointer indicates that more than n data elements are buffered for said particular data consumer, where n is the size of the buffer requested by said particular data consumer.

13. A method as recited in claim 12, wherein the steps of reading a data element and advancing the read pointer are performed atomically.

14. A method as recited in claim 12, wherein the steps of writing the data element and advancing the write pointer are performed atomically.

15. A method as recited in claim 12, wherein the advancing step comprises:

advancing the read pointer corresponding to said individual data consumer when the write pointer advances ahead of said read pointer by more than n.

16. A method as recited in claim 12, further comprising the following additional step:

in response to a flush request by an individual data consumer, setting the read pointer corresponding to said individual data consumer so that it equals the write pointer.

17. A method as recited in claim 12, further comprising the following additional step:

in response to a flush request by an individual data consumer, setting the read pointer corresponding to said individual data consumer to indicate that no more data elements are available from the plurality of registers.

18. A computer program to be executed by a computer stored on one or more computer-readable storage media for buffering sequential data elements from an input stream for consumption by a plurality of data consumers, wherein different data consumers request buffers having different numbers of registers, the program comprising the following steps:

cycling a write pointer through a circular sequence of registers to indicate where sequential data elements from the input stream should be written;

cycling a plurality of read pointers independently through the circular sequence of registers to indicate where data should be consumed by respectively corresponding data consumers;

advancing the read pointer corresponding to a particular data consumer when the relationship between said read pointer and the write pointer indicates that more than n data elements are buffered for said particular data consumer, where n is the number of registers requested by said particular consumer.

19. A program as recited in claim 18, further comprising a step of allocating enough registers in the circular sequence of registers to satisfy the largest buffer size request.

20. A program as recited in claim 18, the advancing step comprising:

advancing the read pointer corresponding to said individual data consumer when the write pointer advances ahead of said read pointer by more than n.

21. A program as recited in claim 18, further comprising:

in response to a flush request by an individual data consumer, setting the read pointer corresponding to said individual data consumer so that it equals the write pointer.

22. A program as recited in claim 18, further comprising:

in response to a flush request by an individual data consumer, setting the read pointer corresponding to said individual data consumer to indicate that no more data elements are available from the plurality of registers.

\* \* \* \* \*